United States Patent [19]
van der Meer et al.
[11] Patent Number: 4,670,085
[45] Date of Patent: Jun. 2, 1987

[54] APPARATUS FOR PEELING PRINT SHEETS FROM DISPOSABLE SHEET PORTIONS OF FILM UNIT ASSEMBLIES

[75] Inventors: Jan van der Meer, Enschede, Netherlands; Kurt Hagen, Obfelden, Switzerland

[73] Assignee: Polaroid Corporation, Cambridge, Mass.

[21] Appl. No.: 810,320

[22] Filed: Dec. 18, 1985

[51] Int. Cl.[4] .................... B32B 31/18

[52] U.S. Cl. .................... 156/584; 156/344; 226/5; 430/256

[58] Field of Search .................... 156/344, 584; 226/5; 430/256

[56] References Cited

U.S. PATENT DOCUMENTS

| | | | |
|---|---|---|---|
| 3,033,741 | 5/1962 | D'Amato et al. | 156/584 |
| 3,727,815 | 4/1973 | Schwartz | 156/584 X |
| 3,936,343 | 2/1976 | Walls | 156/368 |
| 4,183,751 | 1/1980 | Matsumoto et al. | 156/344 X |
| 4,196,040 | 4/1980 | Houck | 156/584 |
| 4,285,759 | 8/1981 | Allen et al. | 156/584 |
| 4,404,275 | 9/1983 | Hutchinson | 156/344 X |
| 4,508,589 | 4/1985 | Tarui et al. | 156/584 |

*Primary Examiner*—Robert A. Dawson
*Attorney, Agent, or Firm*—Karl Hormann

[57] ABSTRACT

Apparatus for peeling positive print sheets from disposable components of peel-apart diffusion transfer film unit assemblies which comprises an open bottom chassis capable of being positioned over a receptacle and supporting a rotatable drum for carrying a processed film unit assembly into operative relationship with peeling blade assemblies to remove the print and release the remaining components of the film assembly for disposal through the open bottom of the chassis. The peeling components engage only marginal portions of the print and involve a combination of a movable peeling blade to engage the leading marginal edge of the print and a pair of fixed peeling blades which engage the side margins of the print and retain the print for manual removal from the apparatus.

9 Claims, 10 Drawing Figures

APPARATUS FOR PEELING PRINT SHEETS FROM DISPOSABLE SHEET PORTIONS OF FILM UNIT ASSEMBLIES

BACKGROUND OF THE INVENTION

This invention relates to apparatus for separating photographic prints from negatives and, more particularly, it concerns apparatus for separating diffusion transfer prints from negative and carrier sheet assemblies after exposure and processing in photographic apparatus designed to handle such film components.

In the field of instant photography, the diffusion transfer method of obtaining a positive print or transparency from an exposed negative is well known and is adaptable to a variety of film constructions and/or assemblies of film components. In the early stages of diffusion transfer processing, initially separate positive and negative film components were supported on respective carrier sheets, the latter being connected at a leader so that after exposure of the negative in a camera, for example, the leader and carrier sheets enabled the positive and negative film components to come together in overlying coextensive relationship. Upon further removal of the film assembly from the camera, processing fluid was spread between the negative and positive sheets as the assembly exited from the camera. After an interval of time, referred to in the art as an inbibition period, the positive print was peeled from the negative and other components of the film assembly. The negative and other film components, including any residual processing fluid remaining on the negative or the carrier components, were discarded. Later in the evolution of diffusion transfer films, "integral" film units were developed in which the entire diffusion transfer chemistry was contained between two sheets permanently secured by an exterior frame component. Such integral film units represented an advance over the prior "peel-apart" units in the sense that the need for discarding part of the film unit as well as potential skin irritation and/or clothing damage by contact with the processing fluid were avoided.

At the present time, integral diffusion transfer film units are most commonly used in cameras designed primarily though not exclusively for the amateur photographer. On the other hand, many industrial or quasi-industrial applications of instant photography require the peel-apart film units quite similar to those developed during the early stages of diffusion transfer photography. In identification card cameras, for example, it is common practice to form two identification card formats on each standard-sized diffusion transfer print and later sever the two halves of the print for assembly in a laminated identification card. Quite obviously, the twin-sheet construction of integral film units does not lend itself to this use. The identification card industry is but an example of many other types of photographic industrial or laboratory type instant photography where the peel-apart film units are desirable.

While the disposal of the negative and other film components peeled from a positive print is not as great a problem to an industrial or laboratory environment as it might be to an amateur photographer, for example, the potential for skin irritation or clothing damage by the processing fluid remaining on the discarded components after separation from the positive print remains a problem, particularly in laboratories or installations where a single operator may be required to process or handle a large number of the peelapart units in a given work period. Also there is a need to await the length of time required for inbibition before the positive print is peeled from the disposed film components. These problems are adequate to justify an automated apparatus by which the positive print of a diffusion transfer film assemblage may be peeled from the other components and the other components discarded with a minimal amount of manual handling.

SUMMARY OF THE INVENTION

In accordance with the present invention, apparatus is provided for peeling, particularly a positive print sheet from the disposable components of a peel-apart diffusion transfer film unit assembly, which requires manual handling, if at all, only of the film unit leader and which involves physical contact of peeling components only with image framing borders of the print sheet.

The apparatus is embodied in an open-bottom chassis capable of positioning over a receptacle and supporting a rotatable drum for carrying a film unit assembly into operative relationship with movable and fixed peeling assemblies to remove the print and then release the remaining components of the film unit assembly for disposal through the open bottom of the chassis. The drum includes means for releasably securing the leader portion of the film unit assembly during operation of the peeling components, such means being automatically conditioned to an open film receiving orientation at the end of each cycle of operation. Means are provided also for presenting a processed film unit assembly to the drum and initiating an operating cycle of the apparatus.

A principal object of the invention therefore is the provision of an apparatus for effectively removing a print sheet from a film unit assembly with a minimum of manual handling and without disturbing the image area of the print sheet. Another object of the invention is the provision of a low cost apparatus for carrying out the aforementioned operation. A still further object of the invention is the provision of such an apparatus which is easily disassembled for cleaning and general maintenance, which requires a minimal amount of space for its use and which is capable of automated operation. Other objects and further scope of applicability of the present invention will become apparent from the detailed description to follow taken in conjunction with the accompanying drawings in which like parts are designated by like reference numerals.

DETAILED DESCRIPTION OF THE PREFERRED EMBODIMENTS

Figure 1:
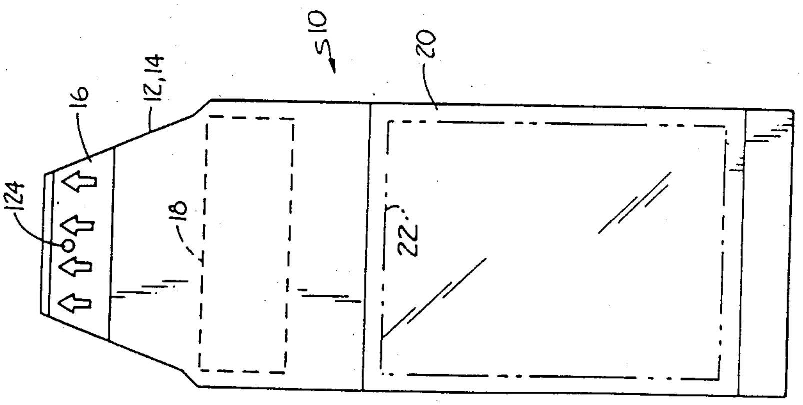
FIG. 1 is a plan view illustrating a film assembly from which a positive print may be peeled by the apparatus of the present invention.

In FIG. 1 of the drawings, a conventional, peel-apart, diffusion transfer film unit assembly is designated generally by the reference numeral 10. Although the complete layered construction of the assembly 10 is not illustrated in FIG. 1, the assembly is conventional in the sense that it includes superimposed positive and negative carrier sheets 12, 14 joined to a common leader portion or end 16. As depicted in FIG. 1, the negative carrier sheet 14 underlies the positive carrier sheet 12 and a rupturable pod 18 of processing fluid is sandwiched between the leading end portions of the two carrier sheets 12 and 14. A positive print sheet 20 is secured marginally to the positive carrier sheet 12 about an image frame opening or window 22. As is well known in the art, after exposure of the negative portion of the assembly in a camera or equivalent apparatus, the assembly is processed by pulling or otherwise advancing the leader 16 through a pressure roller pair or equivalent which causes the pod 18 to rupture and the processing fluid to be spread uniformly between the superimposed carrier sheets 12, 14 as well as between the positive print sheet 20 and the underlying negative. When the positive print 20 is removed from the assembly, the marginal portion thereof extending past the window 22 defines a nonimage frame about the positive image formed on the sheet 20. Also as is well known, after separation of the print sheet 20 from the assembly 10, all but the print sheet 20 is discarded.

In FIGS. 2–5 of the drawings, one embodiment of a machine, generally designated by the reference numeral 25, is shown to include a supporting frame or chassis established by vertically oriented walls 26 and 27 joined a the front and rear ends thereof by front and rear bridging walls 28 and 30, respectively. The generally rectangular assembly of the walls 26, 27, 28 and 30 is open at its bottom edge 31 to facilitate placement thereof over a receptacle (not shown). The major operating components supported by the chassis include a rotatably mounted drum 32, a movable peeling blade assembly 34 and a pair of fixed peeling blades 36, all of which will be described in more detail hereinafter.

Figure 3:
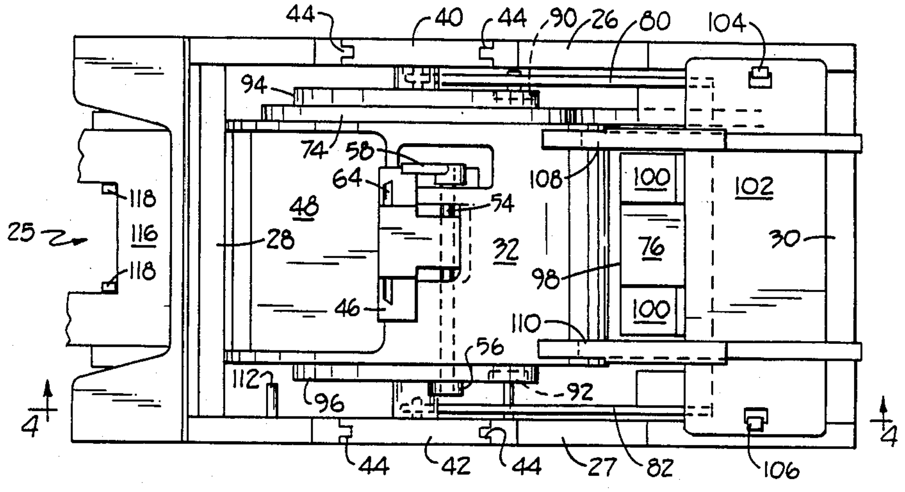
FIG. 3 is a top plan view of the apparatus shown in FIG. 2.

The drum 32 is rotatably supported by an axle 38 secured at opposite ends in plates 40 and 42 which, in turn and as shown most clearly in FIG. 3, are removably received by way of dovetail ways 44 in the vertical walls 26 and 27 of the chassis. Although generally cylindrical in exterior conformation, the drum 32 is formed with a clamping flat 46 which joins with a chordal leader flat 48. As shown most clearly in FIG. 4, a V-shaped groove 50 extends axially across the face of the drum near the end of the chordal leader flat 48 to be spaced from the clamping flat 46 by approximately 90°. The periphery of the drum 32 in the remaining three quadrants is essentially cylindrical and smooth. Also the overall circumference of the drum is of a length at least equal to the length of the film unit 10.

A leader clamping jaw 52 is supported by the drum 32 in operative relationship with the clamping flat 46. In particular, the clamp 52 is rotatably fixed at one end to a pivot shaft 54 journalled axially in the drum 32. The shaft 54 extends through one end of the end face of the drum 32 to a trip lever 56. At its other end, the shaft is secured to a toggle lever 58 located in a generally radial well 60 formed in the drum 32. The outer end of the clamp 52 is formed with a tang 62 to engage in a complementing slot 64 in the clamping flat 46 of the drum 32. As may be seen in FIG. 4, the end of the toggle lever 58 is secured to a tension spring 66 extending within the well 60 to a point which cooperates with the toggle lever 58 in an over-dead-center relationship. In other words, the spring 66 retains the clamp 52 firmly against the flat 46 in the position illustrated in FIG. 4. When the clamp 52 is pivoted approximately through 90° in a clockwise direction relative to that shown in FIG. 4, the spring 66 will retain the clamp in an open condition as a result of passing the axis of the pivot shaft 54.

The drum 32 is adapted to be driven in rotation on the axle 38 by an electric motor 68 secured to the wall 26. Driving connection of the motor 68 and drum 32 is through a gear train including a drive gear 70 associated with the motor 68, an idler gear 72 journalled on the wall 26 and a driven gear 74 secured to one end face of the drum 32. Thus, movement of the drum 32 may be controlled by operation of the motor using appropriate electric circuit control means (not shown).

Figure 4:
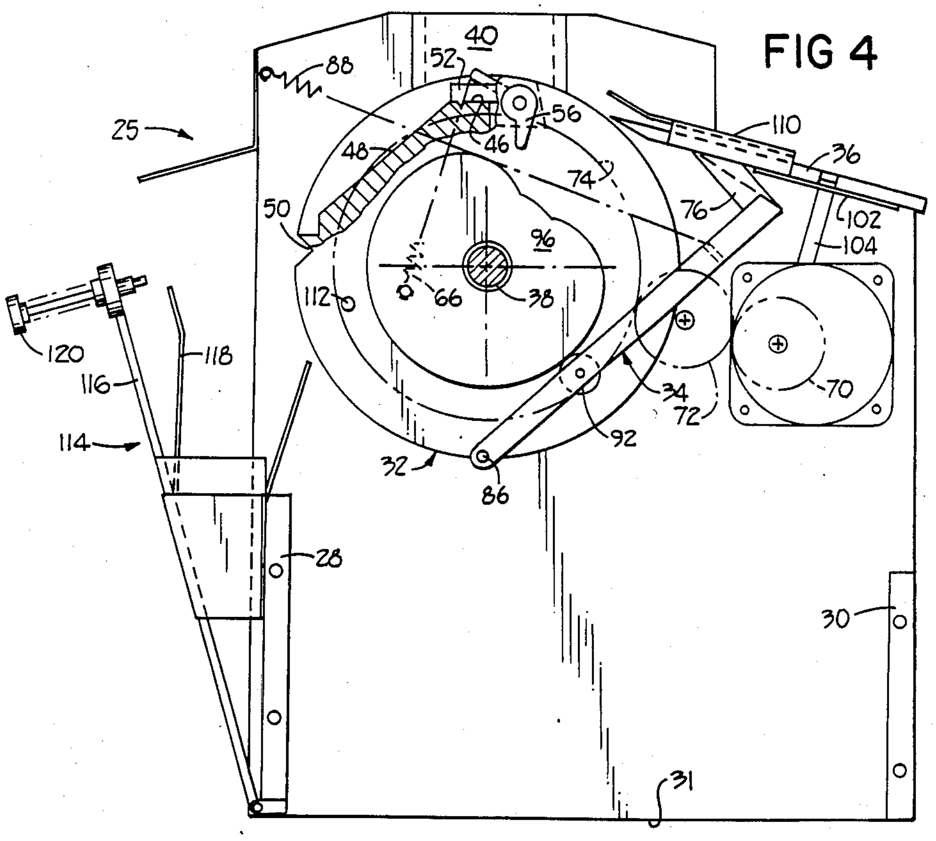
FIG. 4 is a partially cut away side elevation illustrating the apparatus of the invention.
Figure 5:
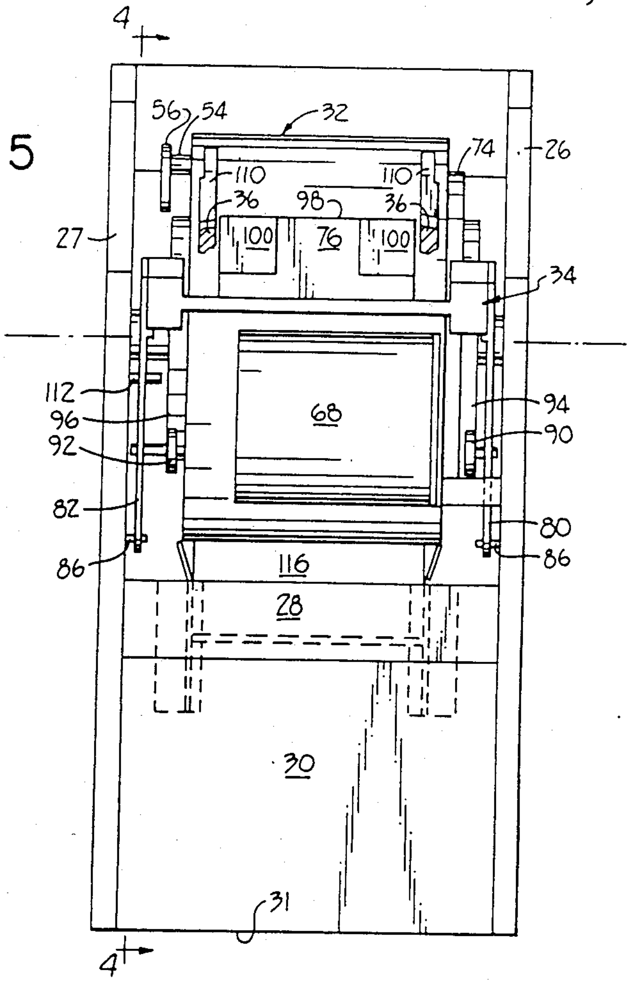
FIG. 5 is a rear elevation of the apparatus.

The construction of the movable peeling blade assembly 34 is shown most clearly in FIGS. 4 and 5 of the drawings to include a peeling blade component 76 cantilevered forwardly of a bracket 78 supported at opposite ends from the upper ends of two arms 80 and 82. The arms 80 and 82 are pivotally supported by stub axles 84 and 86 anchored in the chassis walls 26 and 27, respectively. As shown in FIG. 4, the assembly 34 is biased about its pivotable support 84, 86 toward the front of the machine 25 by tension springs 88 extending from the upper front portion of the walls 26, 27 back to the arms 80, 82. Supported between the pivot axles 84 and 86 and the ends of each arm are cam follower rollers 90 and 92 which engage the periphery of cam plates 94 and 96 secured to the opposite ends of the drum 32. The configuration of the cam plates is illustrated clearly in FIG. 4 and it is to be understood that both cam plates are at the same angular orientation and thus cooperate synchronously with the rollers 90 and 92 on the respective arms 80 and 82.

The blade component 76 of the assembly 34 terminates forwardly in a knife edge 98 which diverges more abruptly at its ends as a result of a pair of inclined block formations 100 (FIG. 5) on opposite ends of the blade component 76. Also it is to be noted that the width of the blade 76 is less than the full width of the print sheet 20 to be peeled from the processed film unit assembly 10.

The fixed peeling blades 36 are spaced outwardly of the movable blade 76 and formed with pointed ends meeting the periphery of the drum 32 so that the top surface of the blades 36 lie substantially on a tangent to the drum 32. The blades 36 are fixed to a mounting plate 102 extending across and resting on an inclined top surface portion of the chassis walls 26 and 27. The plate 102, in turn, is secured in place by spring clips 104 and 106 secured to the inner surfaces of each of the chassis walls 26 and 27, respectively. Also a pair of retainer clips 108 and 110 are positioned on top of the fixed peeler blades 36 to retain a print sheet 20 on the blades after it has been peeled from the film assembly 10.

Figure 2:
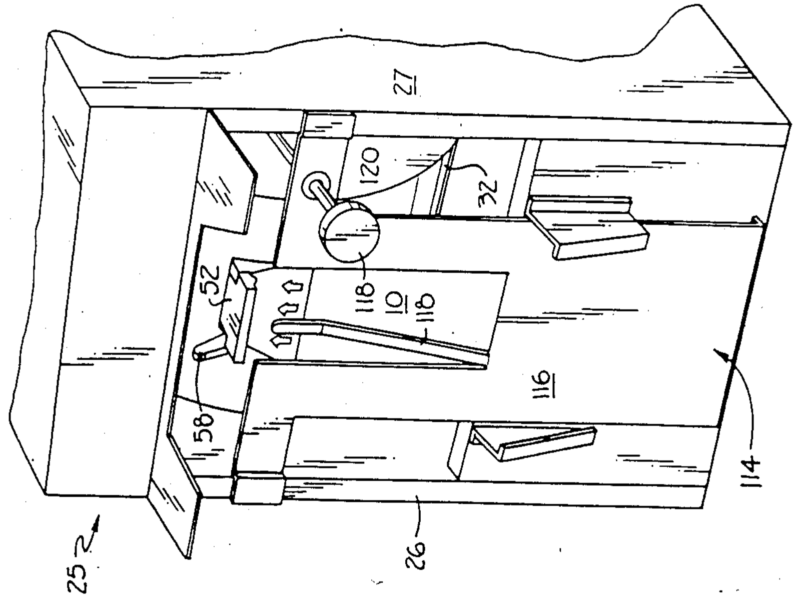
FIG. 2 is a fragmentary perspective view illustrating the film loading or front end of the apparatus of the invention.
Figure 7:
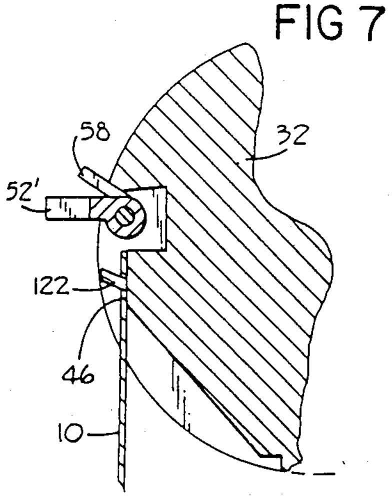
FIG. 7 is a fragmentary cross section on line 7—7 of FIG. 6.
Figure 8:
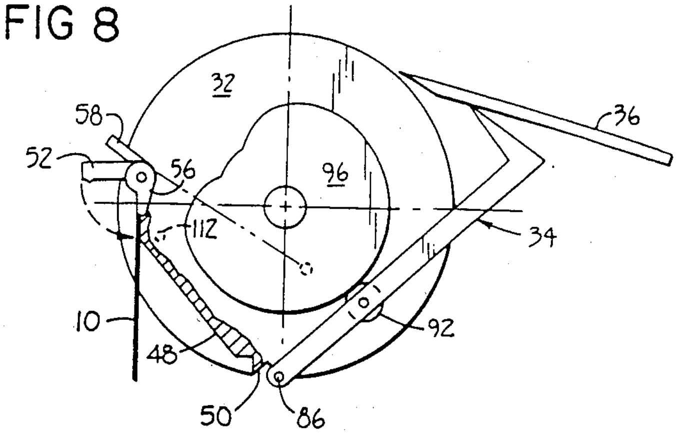
FIGS. 8-10 are largely schematic views illustrating various stages of operation of the apparatus.

As shown in FIG. 3, a pin 112 projects inwardly from the chassis wall 27 to lie in the path of the drum carried trip lever 56 associated with the clamp 52 as described above. While the pin 112 does not appear in the other drawing figures, its position is designated by the reference numeral 112 in each of FIGS. 4 and 8–10 of the drawings. The position of the pin 112 assures that when the drum 32 rotates in a clockwise direction, as seen in FIG. 4, from the twelve o'clock position shown to a nine o'clock position in this context, the trip lever 56 will engage the pin 112 to toggle the clamp 52 to an open position as shown in FIGS. 2, 7 and 8 of the drawings. As will be explained more fully in the description of the operation of the apparatus of the invention, the drum is positioned so that the open clamp 52 is in the nine o'clock position for the start of a cycle of operation.

To present a processed film unit assembly 10 to the drum 32 in the embodiment of FIGS. 2–5, a film unit well, generally designated by the reference numeral 114, is positioned at the front of the machine 25. As shown most clearly in FIGS. 2 and 4 of the drawings, the well is constituted in part by the front bridging beam 28 and in part by a pivotal, generally T-shaped plate 116. The plate is provided with a pair of biasing fingers 118 and also supports a spring biased plunger 120. The open or film receiving condition of the well 114 is illustrated in FIG. 4 whereas in FIG. 2, the plate has been pivoted against the front of the chassis walls 26 and 27 to present the leader 16 of a film unit 10 to the clamping flat 46 on the drum with the clamp 52 in its opened position. The push button 120, when depressed against its spring bias, engages the trip lever 56 to toggle the clamp 52 to its closed position under the bias of the tension spring 66 against the leader 16 of the film unit 10.

Figure 6:
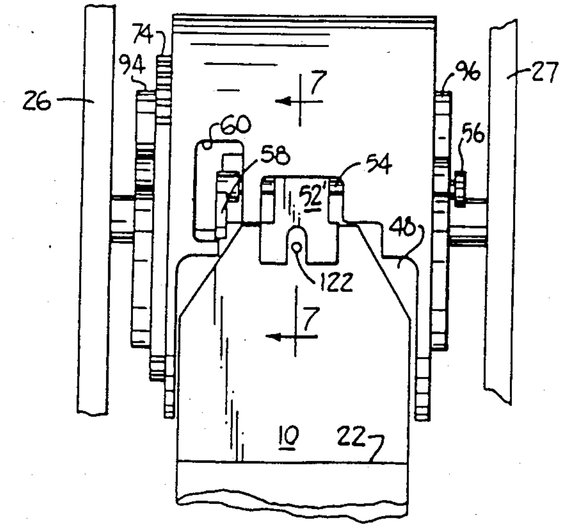
FIG. 6 is a fragmentary front elevation illustrating an alternative embodiment of the apparatus.

As an alternative to the well 114, and as shown in FIGS. 6 and 7 of the drawings, the clamping flat 46 of the drum 32 may be provided with a central suspension pin or hook 122 to be received through an aperture 124 in the leader 16 of the film unit 10. The clamp 52' in this instance is slotted to accommodate the pin 122. With the arrangement shown in FIGS. 6 and 7 the leader of the film unit may be simply placed over the hook pin 22 and the clamp closed over the pin to initiate operation of the machine in a manner to be described. It will be appreciated that in either case, the only portion of the film unit that need be handled in any way is the relatively clean leader end 16.

Figure 9:
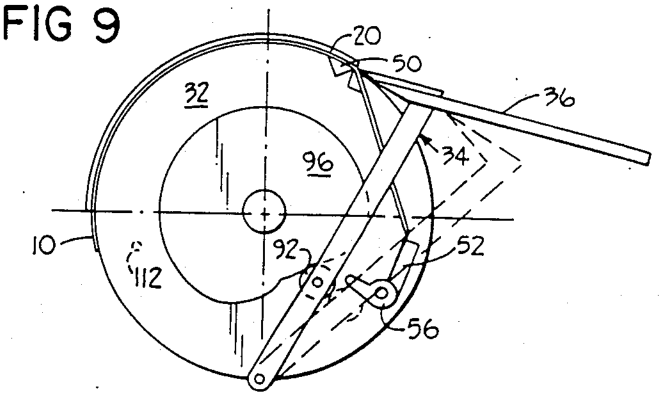
Figure 10:
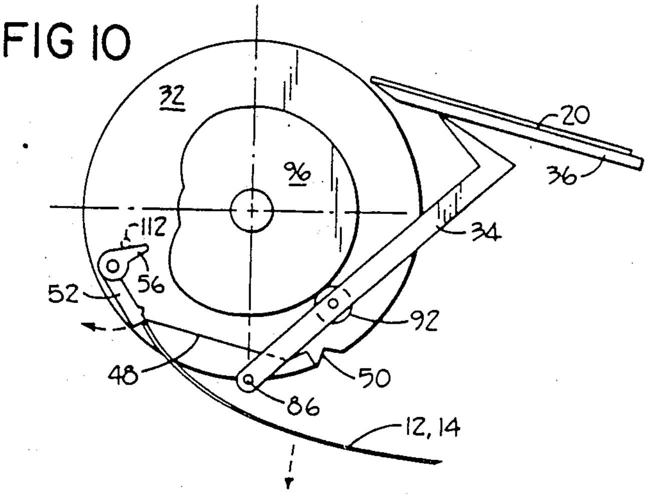

In operation, and as above indicated, initiation of a print peeling cycle is effected by closure of the clamp 52 against the leader 16 of a film unit positioned against the clamping flat 46 on the drum 32. Though not illustrated in the drawings, it is contemplated in accordance with the invention that the electrical circuitry associated with the drive motor 68 will include a timing device related to actuation of the clamp through an appropriate switch so that the motor 16 will not be energized to drive the drum 32 until the proper inbibition period required for diffusion transfer development of the processed film unit 10 has expired. After the period of time has lapsed however, the motor 68 is energized to drive the drum from its initial position as shown in FIG. 8 of the drawings through slightly more than 90° to the position shown in FIG. 9 where the follower rollers 90 and 92 on the movable peeling blade assembly engage a depression in the cam plates 94 and 96. When this occurs, the movable peeler blade 76 is advanced toward the leading edge of the print sheet 20 and projects under the print sheet by a distance not exceeding the width of the marginal unprinted border thereon and as described above with respect to FIG. 1. Also it will be noted that the V-shaped groove 50 in the drum 32 is positioned so that the leading edge 98 of the blade 76 will lie over the V groove during this portion of the operating cycle. As the drum rotates further in a clockwise direction and as depicted in FIG. 9 of the drawings, the movable blade assembly 34 is retracted to its ori9inal position and the print 20 picked up by the fixed blades 36. In this respect, it is to be noted that the blades 36 are spaced so that they engage only the unprinted marginal edge of the print sheet 20. Continued rotation of the drum will cause the print sheet to be advanced over the top of the fixed blades 36 to the approximate position illustrated in FIG. 10. The remainder of the film unit 10 is carried with the drum until the clamp 52 is moved to its open position by the pin 112 causing the remaining portion of the film unit to drop into a receptacle (not shown) positioned under the chassis of the machine.

Thus, it will be appreciated that a result of the present invention, a highly effective print peeling apparatus is provided particularly for film units of the type described and by which the principal objective among others are completely fulfilled. Also it will be apparent to those skilled in the art from the preceeding description that modifications and/or changes may be made in the illustrated embodiments without departure from the invention. Accordingly, it is expressly intended that the foregoing description and accompanying drawings are illustrative only, not limiting, and that the true spirit and scope of the present invention will be determined by reference to the appended claims.

What is claimed is:

1. Apparatus for peeling a print sheet from disposable sheet portions of a film unit assembly having a leading end, said apparatus comprising:
- a rotatable drum having a circumference at least equal to the length of the film unit assembly;
- means for removably securing the leading end of the film unit to said drum;
- a movable peeling blade means movable between a retracted position and an operative position in which said movable peeling blade means partially separates an edge portion of the print sheet from the disposable sheet portion of the film unit assembly; and
- a fixed peeling means located to separate the print sheet from the disposable sheet portion of the film unit assembly upon rotation of said drum relative thereto.

2. The apparatus recited in claim 1, including means for retaining the leading end of a film unit assembly in position for engagement by said removable securing means when said securing means is positioned at a nine o'clock position.

3. The apparatus recited in claim 2, wherein said means for retaining the leading end of a film unit assembly for engagement by said removable securing means comprises hook means projecting from said drum in the region of said securing means.

4. The apparatus recited in claim 2, wherein said means for retaining the leading end of a film unit assembly in position for engagement by said removable securing means comprises well means for receiving a film unit assembly, said well means having a pivotable wall member for moving the leading end of a film unit assembly in said well against said drum in the region of said releasable securing means.

5. The apparatus recited in claim 2, including means for rotating said drum through one revolution in a clockwise direction beginning at a nine o'clock position, said movable and fixed peeling means being located between a twelve o'clock and three o'clock position of said drum, and means for releasing the remainder of said film unit assembly after separation therefrom of said print sheet means, for gravity fall to a receptacle.

6. The apparatus recited in claim 1, wherein said means for releasably securing the leading end of the film unit comprises a pivotable clamping jaw and toggle means for biasing said jaw to both closed and open positions.

7. The apparatus recited in claim 6, comprising a trip lever connected with said pivotable clamping jaw, fixed abutment means positioned in the path of said trip lever upon rotation of said drum to engage said trip lever and move said clamping jaw to an open position near the end of one revolution of said drum.

8. The apparatus recited in claim 1, wherein said movable peeling blade means comprises a pivotable assembly biased in the direction of said drum and cam means on said drum for controlling movement of said pivotable assembly.

9. The apparatus recited in claim 1, wherein said fixed peeling means comprises a pair of spaced peeling blades positioned to engage only the marginal edge portions of said print sheet.

* * * * *